United States Patent [19]

Teramachi

[11] Patent Number: 4,832,508
[45] Date of Patent: May 23, 1989

[54] RECTILINEAR SLIDE BALL BEARING

[76] Inventor: Hiroshi Teramachi, 34-8, Higashitamagawa 2-chome, Setagaya-ku, Tokyo, Japan

[21] Appl. No.: 92,926

[22] Filed: Sep. 4, 1987

[30] Foreign Application Priority Data

| Sep. 9, 1986 [JP] | Japan | 61-210727 |
| Dec. 3, 1986 [JP] | Japan | 61-286835 |
| Dec. 3, 1986 [JP] | Japan | 61-286836 |

[51] Int. Cl.$^4$ ............................................. F16C 29/06
[52] U.S. Cl. ......................................... 384/45; 384/43
[58] Field of Search ............................ 384/43, 44, 45

[56] References Cited

U.S. PATENT DOCUMENTS

| 4,296,974 | 10/1981 | Teramachi | 384/45 |
| 4,502,137 | 3/1985 | Osawa | 384/45 |
| 4,557,530 | 12/1985 | Haase | |
| 4,582,369 | 4/1986 | Itoh | 384/45 X |
| 4,662,763 | 5/1987 | Itoh | 384/45 |

FOREIGN PATENT DOCUMENTS

| 0211243 | 2/1987 | European Pat. Off. . |
| 2416250 | 10/1974 | Fed. Rep. of Germany . |
| 2240656 | 7/1975 | France . |
| 2573143 | 5/1986 | France . |
| 55-72912 | 6/1980 | Japan . |
| 59-58224 | 4/1984 | Japan . |
| 59-58225 | 4/1984 | Japan . |

*Primary Examiner*—Thomas R. Hannon
*Attorney, Agent, or Firm*—Armstrong, Nikaido, Marmelstein, Kubovcik & Murray

[57] ABSTRACT

A rectilinear slide ball bearing consists of a slide board, a pair of cover members, a rail-like track mount and a multiplicity of balls. The slide board assumes a substantially gate-like configuration and has a pair of load ball grooves formed in the inner surface of a recession in the longitudinal direction. The cover members include ball circulation passages for constituting ball endless tracks. The balls roll between the load ball grooves of the slide board and ball rolling grooves formed in the track mount while undergoing the load. The pair of one-sidedly provided up-and-down load ball grooves formed in each sleeve portion of the slide board are internally formed with ball rolling surfaces and constituted by deep grooves whose opening width is smaller than at least a diameter of the ball. With this arrangement, the balls do not come off from the load ball grooves of the slide board when separating the slide board from the track mount.

4 Claims, 11 Drawing Sheets

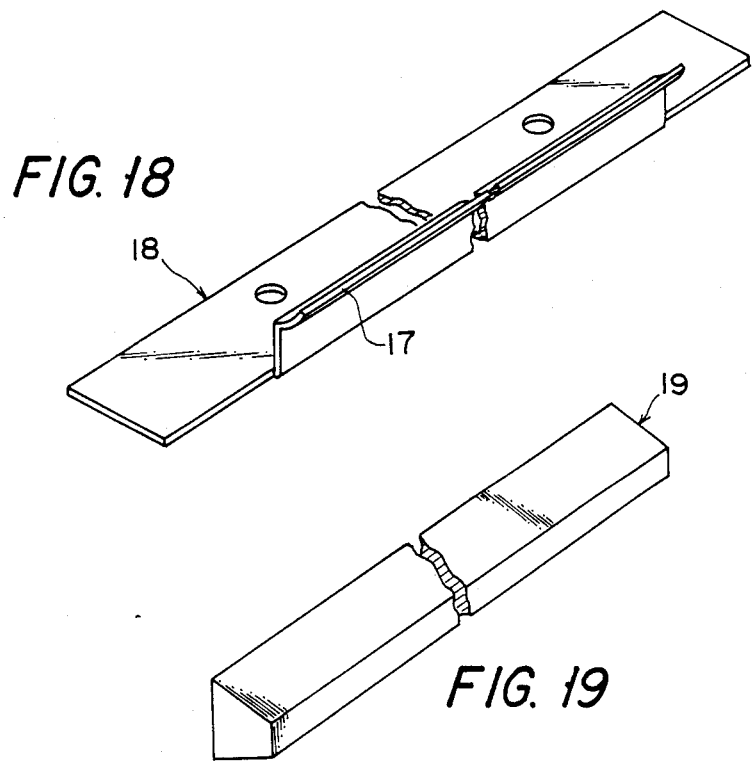
FIG. 18
FIG. 19
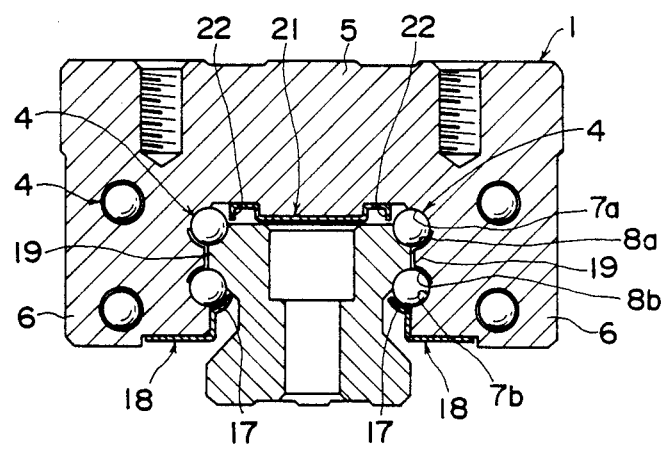
FIG. 20

RECTILINEAR SLIDE BALL BEARING

FIELD OF THE INVENTION AND RELATED STATEMENT

The present invention relates to a rectilinear slide ball bearing for rectilinearly guiding a movable member to be shifted in a slide portion of an industrial robot and a machine tool such as an NC machine.

A well-known conventional rectilinear slide ball bearing (Japanese Patent Publication No. 38,812/1982) of this type consists of: a slide board which assumes a substantially gate-like configuration in cross-section and has a horizontal member, sleeve portions extending downwards from both ends of this horizontal member and a recession formed downwards, each sleeve portion including a pair of load ball grooves chased in its inner surface in the longitudinal direction thereof and non-load ball passages corresponding to the pair of load ball grooves; a pair of cover members which are fitted to the to-and-fro end surfaces of the slide board and include ball circulation passages, formed in the inner surfaces, for constituting ball endless tracks by communicating the individual ends of the load ball grooves with the ends of the non-load ball passages which correspond to each other; a ball retainer, installed between the pair of cover members, for preventing slip-off of the balls rolling along the load ball grooves, the ball retainer being formed of a metal plate by press molding and formed with slots each having its width which is slightly smaller than a diameter of the ball, these slots being disposed along the load ball grooves formed in the inner surfaces of the sleeve portions of the slide board; a rail-like track mount formed with ball rolling grooves corresponding to the load ball grooves, this track mount having its upper portion which is so fitted in the recession of the slide board as to keep a predetermined spacing therebetween; and a multiplicity of balls rolling between the load ball grooves of the slide board and the ball rolling grooves of the track mount while undergoing the load. The rectilinear slide ball bearing including the above-described ball retainer has advantages of preventing the the slip-off of the balls from the slide board when separating the slide board from the track mount and of improving the operativity in incorporation into the machine tool or the like.

In the convetional rectilinear slide ball bearing, however, the ball retainer is formed of a thin metal plate by press moulding and formed with slots whose width is slightly smaller than the diameter of the ball. The retainer is installed between the pair of cover members, and hence the retainer is fragile especially against the torsion. The ball retainer is apt to be deformed because of a lack of strength and rigidity; a warp is produced; and an error is created in the dimension of width. Under such circumstances, it is difficult to process the retainer in an accurate manner. Even if the accurate processing can be effected, the error is easily created on account of the deformation. This will produce noises when brought into a contact with the balls in use and will often be an obstacle against a smooth sliding motion. Where the ball retainer and the cover members are mounted on the slide board, this process requires the exact positioning between these three components. The positioning has to be performed mannually, which causes a problem of hindering the automation of assembly of the bearing.

OBJECT AND SUMMARY OF THE INVENTION

The present inventor has pursued a variety of researches into means for preventing balls rolling in load ball grooves formed in a slide board from falling off therefrom when separating the slide board from a track mount without employing a ball retainer installed astride the slide board and a pair of cover members. As a result of this pursuit, the present inventor has devised this invention.

Accordingly, it is a primary object of the present invention to provide a novel rectilinear slide ball bearing capable of preventing the slip-off of the balls from the load ball grooves formed in the slide board when separating the slide board from the track mount, this bearing permitting the automatization of assembly thereof as well as its accurate formation and assembly.

Another object of the invention is to provide a rectilinear slide ball bearing which permits the assembly thereof to be automated and is arranged such that: deep grooves which constitute the load ball grooves are chased in the inner surface of a recession formed in the slide board by installing a ball retaining plate or a ball retaining base or further a partition member according to demand., the positioning is effected to exhibit a one to one relation between the slide board and any one of the ball retaining plate, the ball retaining base and the partition member, whereby it is feasible to obtain the firm and highly accurate installation regardless of the pair of cover members attached to the to-and-fro end surfaces of the slide board.

Still another object of the invention is to provide, in a rectilinear slide ball bearing which comprises: a slide board assuming a substantially gate-like configuration in cross section and having a horizontal member, sleeve portions extending downwards from both ends of the horizontal member and a recession formed downwards, each sleeve portion including a pair of load ball grooves formed in its inner surface in the longitudinal direction thereof and non-load ball passages corresponding to the pair of load ball grooves; a pair of cover members fitted to the to-and-fro end surfaces of the slide board and including ball circulation passages, formed in the inner surfaces, for constituting ball endless tracks by communicating the individual ends of the load ball grooves with the ends of the non-load ball passages; a rail-like track mount formed with ball rolling grooves corresponding to the load ball grooves, this track mount having its upper portion which is so fitted in the recession of the slide board as to keep a predetermined spacing therebetween; a multiplicity of balls rolling between the load ball grooves of the slide board and the ball rolling grooves of the track mount while undergoing the load, the improvement characterized in that the pair of one-sidedly provided up-and-down load ball grooves chased in the inner surfaces of the sleeve portions of the slide board in the longitudinal direction include ball rolling surfaces shaped therein, the load ball grooves being composed of deep grooves whose opening width is smaller than at least a diameter of the ball.

In the present invention, means for constituting such deep grooves in the inner surface of each sleeve portion of the slide board in the longitudinal direction will take variant forms as follows.

Such is the arrangement of first means that the pair of up-and-down deep grooves are formed in the inner surfaces of the respective sleeve portions by direct cutting and by a grinding process, and the deep grooves are vertically sectioned by a partition provided therebetween. In this case, the partition positioned between the deep grooves is so formed as to be integral with the slide board.

Second means is arranged in such a way that: recessed grooves which are so formed in the inner surfaces of the sleeve portions of the slide board in the longitudinal direction thereof as to be open downwards; ball rolling surfaces are formed at the up-and-down corners of the recessed grooves; a ball retaining plate having a retaining piece which protrudes such as to extend from the ball rolling surface formed at the lower corner of each recessed groove is provided at the lower portion of the inner surface of each of the sleeve portions; the partition is provided between the ball rolling surfaces on the side of the sleeve portion in the longitudinal direction., and the pair of deep grooves are disposed by vertically sectioning the recessed grooves by use of the partition. In the second means, the partition is composed of a partition member assuming a substantially trapezoidal configuration in section which is formed separately from the slide board. It is desired that the formation of the partition be made by fitting the partition member in a dovetail groove chased in the inner surface of each sleeve portion of the slide board in the longitudinal direction.

Third means is arranged in such a manner that: ball retaining bases having retaining pieces provided on both sides thereof are fitted to the underside of the horizontal member within the recession formed in the slide board; ball retaining plates having the retaining pieces provided along the upper edge are installed at the lower portion of the inner surf ate of each sleeve portion; and partitions for forming the pair of up-and-down deep grooves in cooperation with the retaining pieces of the ball retaining bases and with the retaining pieces of the ball retaining plates are provided on both sides of the ball retaining bases and between the ball retaining plates. In the third means, the partitions may be so formed on the side of the inner surface of each sleeve portion in the longitudinal direction as to be integral with the slide board. Furthermore, the partitions may be composed of partition members each assuming a substantially trapezoidal configuration which are formed separately from the slide board, the arrangement being such that the partition members are fitted into dovetail grooves chased in the inner surfaces of the respective sleeve portions in the longitudinal direction.

In the second and third means, the ball retaining bases and the ball retaining plates which are to be mounted on the slide board may be fixed directly to this slide board. The ball retaining bases and the ball retaining plates do not come in contact with the balls rolling on the ball rolling surfaces but may simply serve to prevent the balls in the load ball grooves of the slide board from coming off therefrom in cooperation with the partitions when separating the slide board from the track mount. The material and configuration of such bases and plates are not confined at all. It is, however, desired that the bases and plates be formed of metal for facilitating the automatization of assembly, the metal being effective in ready installation by such a welding method as projection welding, spot welding and the like.

Where the partition provided between the ball retaining base and the ball retaining plate is composed of the partition member formed separately from the slide board, there is no limit in the material and configuration thereof, but preferably they may be formed of synthetic resin in the trapezoidal shape in cross-section. Means for fixing the partition members to the inner surfaces of the individual sleeve portions of the slide board involves the use of arbitrary parts such as machine screws or the like. It is, however, preferable that the fixation be done by fitting the bottoms of the partition members each assuming the trapeziodal configuration in cross-section into dovetail grooves chased in the slide board. On the occasion of installation, the partition members may be fitted into the dovetail gooves from any one of the front and rear end surfaces of the slide board.

The cover members required may be the ones which include ball circulation passages for constituting ball endless tracks by communicating the ends of the load ball grooves with the ends of the corresponding non-load ball passages. However, the cover member is preferably constituted by a cover body formed with four semi-circular slots in the inner surface thereof and by R-pieces (Radius piece), fitted in the central portions of the respective slots of the cover body, for forming halves of the circumferences of the ball circulation passages in which the balls circulate in cooperation with the peripheral edges of the slots. On the occasion of installation, the R-pieces are fitted in the central portions of the slots formed in the cover body, thus forming the cover member. Subsequently, the cover member is preferably fixed to the end surface of the slide board with a bolt or the like.

According to the present invention, the pair of one-sidedly provided up-and-down load ball grooves formed in the individual sleeve portions of the slide board include the ball rolling surfaces formed therein, the load ball grooves being constituted by deep grooves whose opening width is smaller than at least a diameter of the ball. As a result of this arrangement, it is feasible to prevent the balls in the load ball grooves of the slide board from falling off therefrom when separating the slide board from the track mount. In addition, there is no necessity to install a ball retainer astride the slide board and the pair of cover members. It is therefore possible to eliminate a problem in which an error in installation of the ball retainer can not be minimized, because of combination of the installation error created when mounting the pair of cover members on the slide board and another installation error created when installing the ball retainer between the pair of cover members. Moreover, the accurate formation and assembly can be attained, and hence the smooth sliding motion can be obtained. Generation of noises can gradually be prevented, and the assembly of the bearing is facilitated, this further leading to automatization thereof.

The ball retaining plate and the partition or additionally the ball retaining base are provided on the inner surface of the recession formed in the slide board, whereby the pair of up-and-down deep grooves are formed in each sleeve portion of the slide board. Even in the means which utilizes these deep grooves as the load ball grooves, the positioning can be effected to keep the one to one relation between the slide board and the ball retaining plate mounted on the slide board or additionally the ball retaining base or the partition member which is further installed to constitute the partition according to demand. The firm and accurate installation can be attained regardless of the pair of cover members which are fitted to the to-and-fro end surfaces of the slide board. In this case, the assembly of the bearing can be automated.

BRIEF DESCRIPTION OF THE DRAWINGS

FIG. 18 is a perspective view of a ball retaining plate of FIG. 15;

FIG. 19 is a perspective view of a partition member of FIG. 15;

FIG. 20 is a sectional view similar to FIG. 4, illustrating the rectilinear slide ball bearing in a third embodiment of the present invention;

DETAILED DESCRIPTION OF THE PREFERRED EMBODIMENTS

Figure 1:
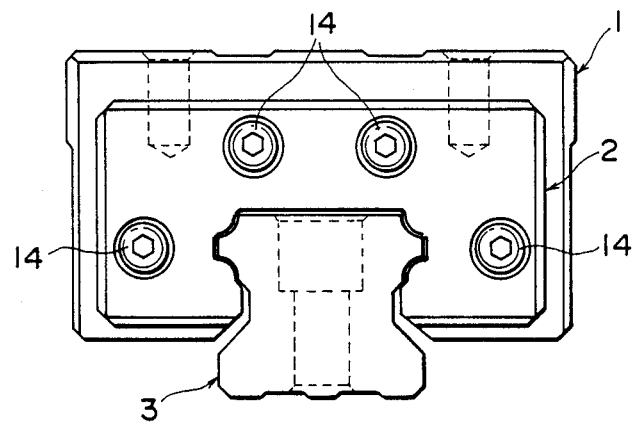
FIG. 1 is a front view of a rectilinear slide bearing, showing an embodiment of the present invention.
Figure 2:
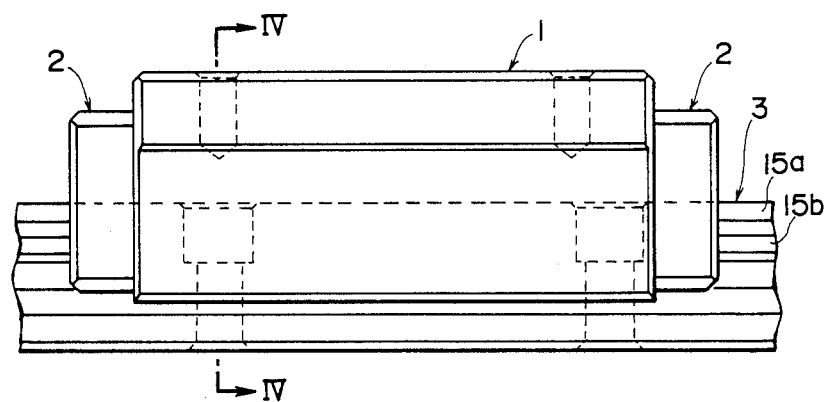
FIG. 2 is a side view of FIG. 1.
Figure 3:
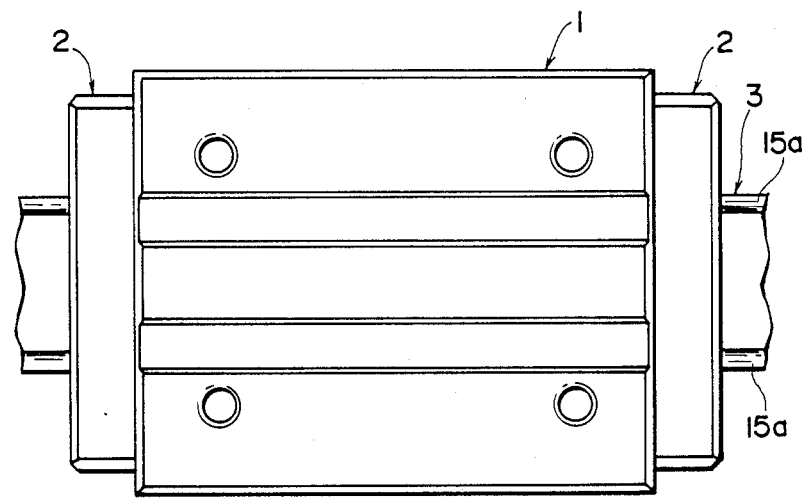
FIG. 3 is a plan view of FIG. 1.
Figure 4:
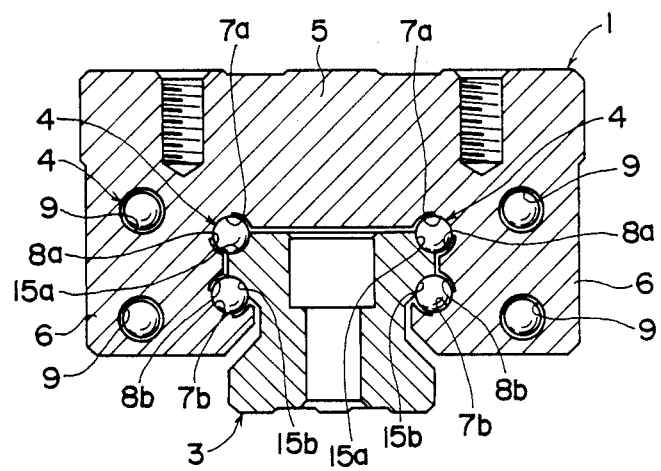
FIG. 4 is a sectional view taken substantially along the line IV—IV of FIG. 2.
Figure 5:
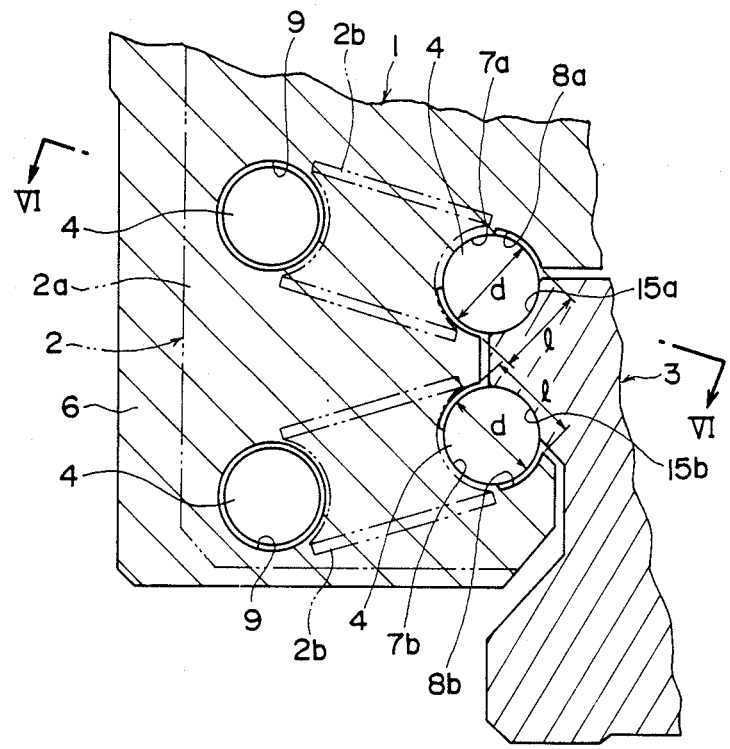
FIG. 5 is a partially enlarged sectional view illustrating the principal portion.
Figure 6:
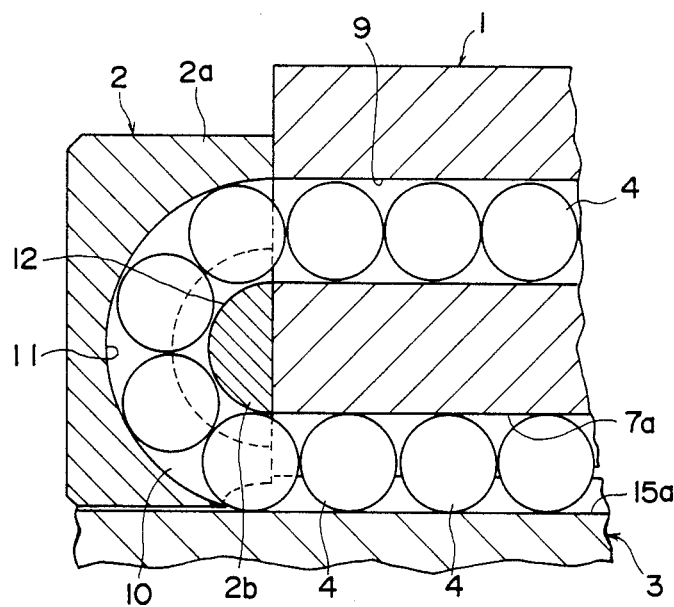
FIG. 6 is a partially sectional view taken substantially along the line VI—VI of FIG. 5.
Figure 7:
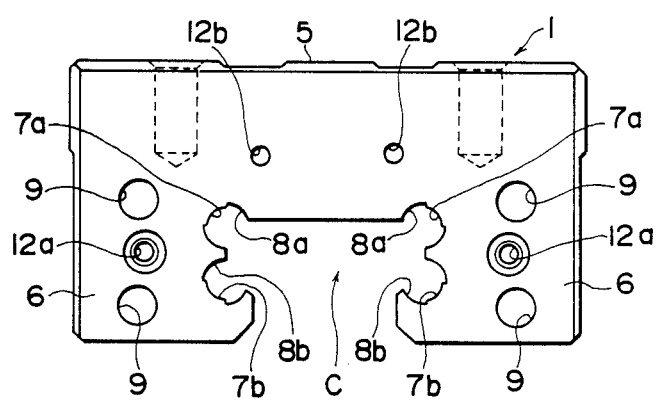
FIG. 7 is a front view of a slide board.
Figure 8:
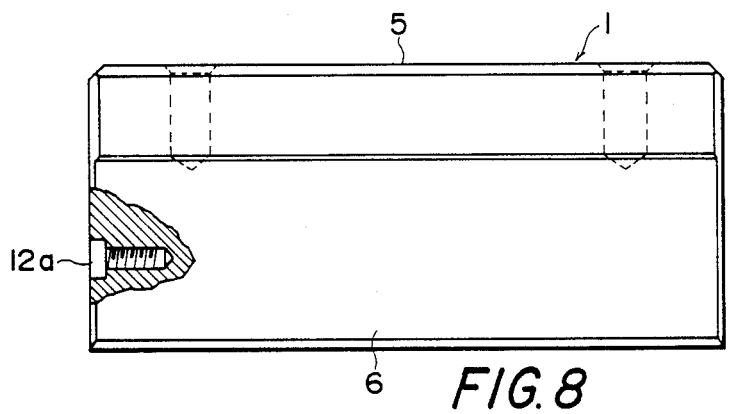
FIG. 8 is a side view of FIG. 7.
Figure 9:
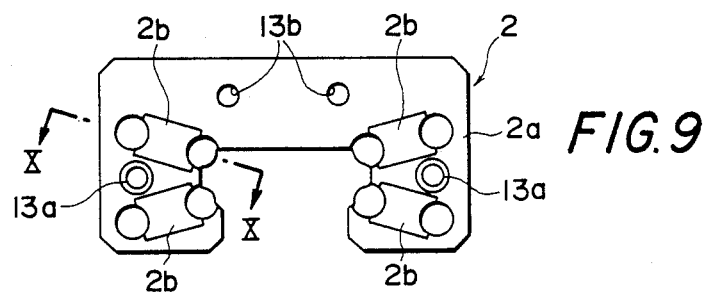
FIG. 9 is a view illustrating the underside of a cover member.
Figure 10:
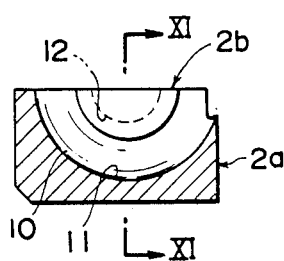
FIG. 10 is a sectional view taken substantially along the line X—X of FIG. 9.
Figure 11:
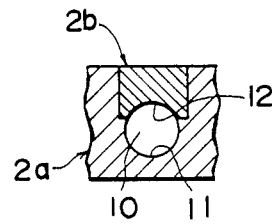
FIG. 11 is a sectional view taken substantially along the line XI—XI of FIG. 10.
Figure 12:
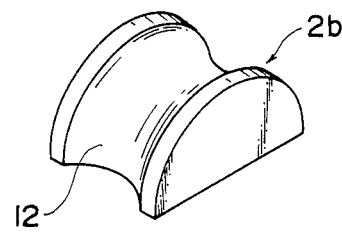
FIG. 12 is a perspective view of an R-piece.

Embodiments of a rectilinear slide ball bearing according to the present invention will hereinafter be described in a tangible manner with reference to the accompanying drawings.

FIGS. 1 through 6 in combination show the rectilinear slide ball bearing in a first embodiment of the present invention. The rectilinear slide ball bearing is composed of: a slide board 1 which assumes a substantially gate-like configuration in cross-section and has a horizontal member 5, sleeve portions 6 extending downwards from both sides of the horizontal member 5 and a recess C between said sleeve portions which is open downwards; a pair of cover members 2 attached to the to-and-fro end surfaces of the slide board 1; a rail-like track mount 3 having its upper portion fitted in the recess C of the slide board 1, keeping a predetermined spacing therebetween; and a multiplicity of balls 4 rolling between the slide board 1 and the track mount 3 while undergoing the load.

The slide board 1 is, as illustrated in FIGS. 4 through 8, internally formed with ball rolling surfaces 7a and 7b which are provided on the inner surfaces of the respective sleeve portions 6 in the longitudinal direction thereof. The slide board 1 further includes a pair of one-sidedly provided up-and-down load ball grooves 8a and 8b which are constituted by a pair of up-and-down deep grooves whose opening width l of each of the ball rolling surfaces 7a and 7b is smaller than at least a diameter d of the ball 4. The load ball grooves 8a and 8b consist of ball contactual circular arc portions which constitute the ball rolling surfaces 7a and 7b on which the load acts when brought into a contact with the balls 4 rolling in the load ball grooves 8a and 8b and of ball non-contactual circular arc portions which shape concentric circular arcs on both sides, the concentric circular arc being slightly larger than the ball contactual circular arc portion. Non-load ball holes 9 which constitute non-load ball passages corresponding to the load ball grooves 8a and 8b are bored in the individual sleeve portions 6 in the longitudinal direction.

Figure 13:
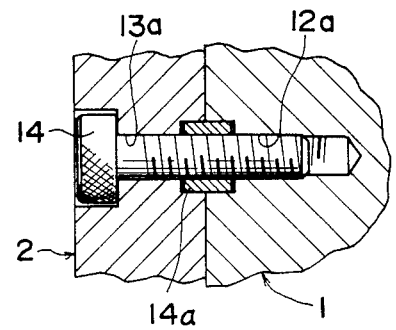
FIG. 13 is a partially sectional view showing a state in which the cover member is attached to the slide board.
Figure 14:
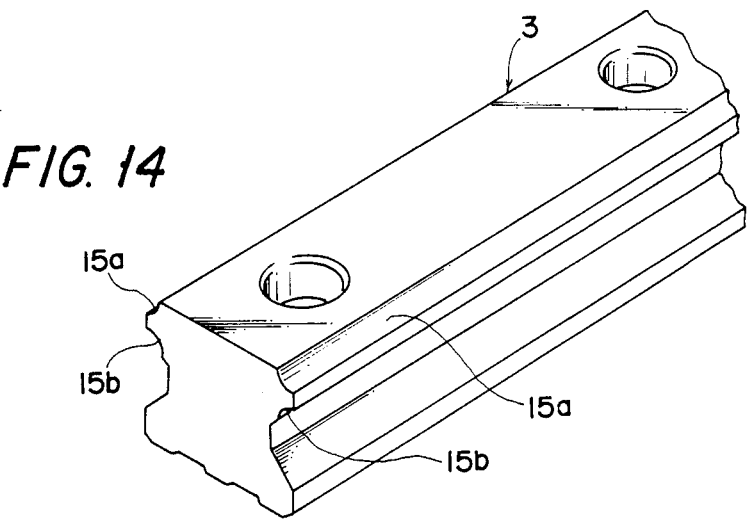
FIG. 14 is a perspective view illustrating a part of a track mount.
Figure 15:
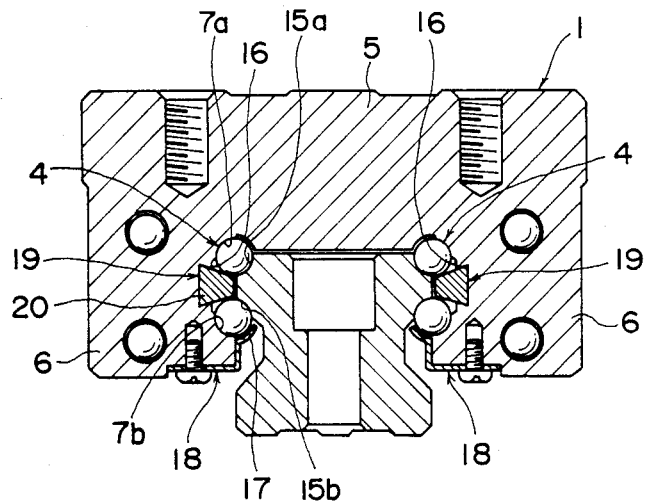
FIG. 15 is a sectional view similar to FIG. 14, showing the rectilinear slide ball bearing in a second embodiment of the present invention.
Figure 16:
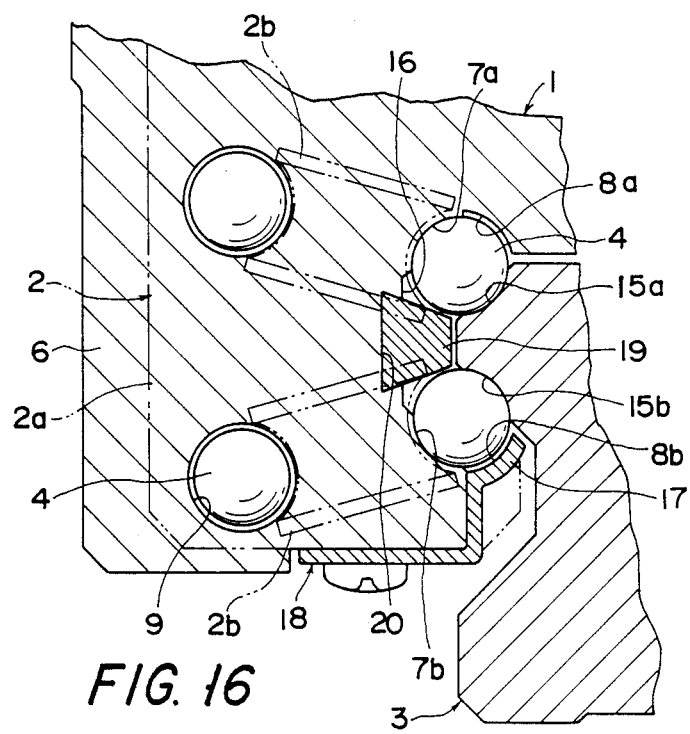
FIG. 16 is a partially enlarged sectional view showing the principal portion of FIG. 15.
Figure 17:
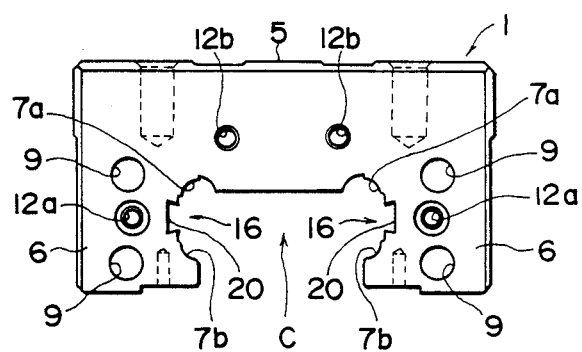
FIG. 17 is a front view similar to FIG. 7, illustrating the slide board of FIG. 15.
Figure 21:
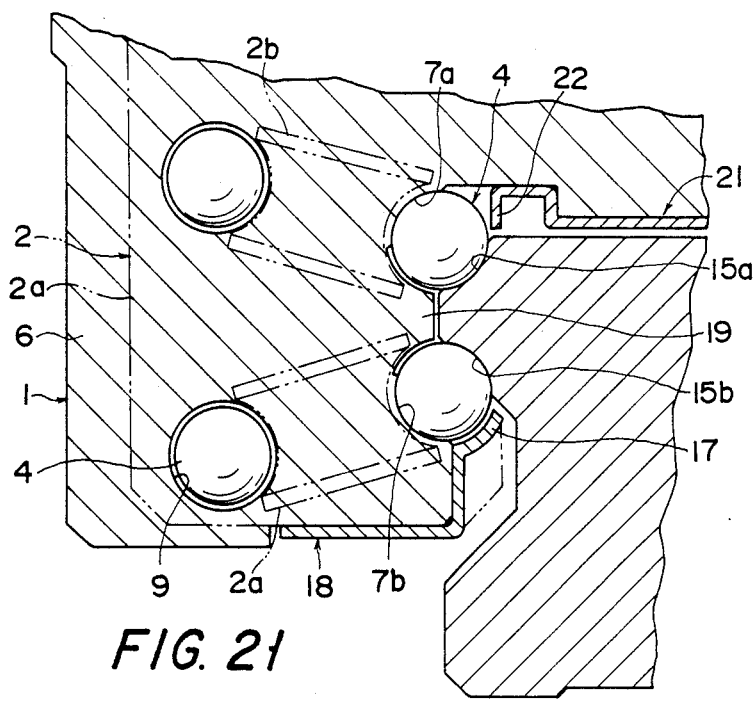
FIG. 21 is a partially enlarged sectional view showing the principal portion of FIG. 20.
Figure 22:
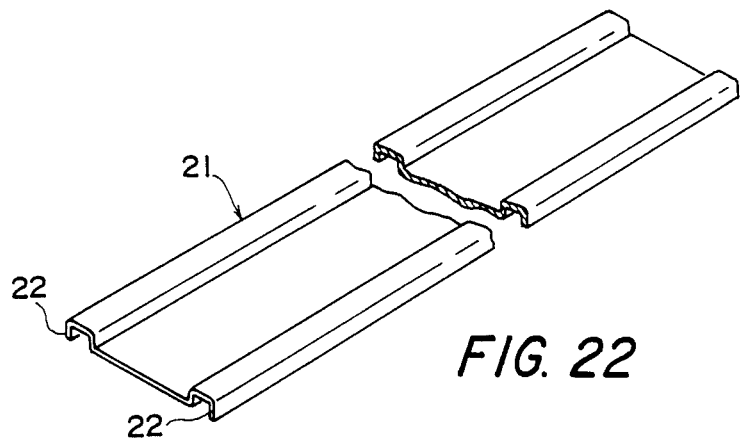
FIG. 22 is a perspective view of a ball retaining base of FIG. 20.
Figure 23:
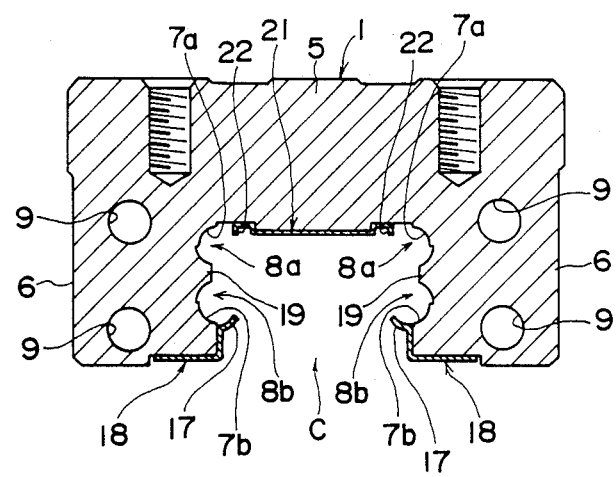
FIG. 23 is a sectional view illustrating the slide board when the track mount is omitted.

The cover members 2 attached to the to-and-fro (or both) end surfaces of the slide board 1, as illustrated in FIGS. 1, 2 and 6 through 9, include ball circulation passages 10 which form ball endless tracks by communicating the respective ends of the load ball grooves 8a and 8b formed in the slide board 1 with the respective ends of the non-load ball holes 9 corresponding to the load ball grooves 8a and 8b. Each of the cover members 2 is composed of a cover body 2a having its inner surface formed with four semi-circular slots 11 and an R-piece 2b fitted in the central portion of the slot 11 formed in the cover body 2a, this R-piece 2b including a circumferential groove 12 which constitutes a half of the circumference of the ball circulation passage 10 through which the balls 4 circulate in cooperation with the circumference of the slot 11, the circumferential groove 12 assuming a substantially semi-disc-like configuration and being formed along the periphery thereof. The attachement of the cover members 2 is performed as follows. Stepped bolt holes 12a and 12b are bored in the to-and-fro ends of the slide board 1. Stepped insertion holes 13a and 13b corresponding to the stepped bolt holes 12a and 12b are formed in the individual cover members 2. A positioning bush 14a is, as illustrated in FIG. 13, provided between the steps of the stepped bolt hole 12a and the stepped insertion hole 13a. An attachement bolt 14 is inserted from the stepped insertion holes 13a and 13b formed in the cover member 2 and is further screwed into the stepped bolt holes 12a and 13b formed in the slide board 1.

The upper portion of the track mount 3 is, as illustrated in FIGS. 1 through 5 and 14, so fitted in the recess C formed in the slide board 1 as to keep a predetermined spacing therebetween. The track mount 3 is formed with ball rolling grooves 15a and 15b corresponding to the ball rolling surfaces 7a and 7b in the load ball grooves 8a and 8b.

Next, a second embodiment of the rectilinear slide ball bearing will be explained with reference to FIGS. 15 through 19. Unlike the first embodiment, deep grooves which are formed in the inner surface of each sleeve portion 6 of the slide board 1 and constitute the pair of one-sidedly provided up-and-down load ball grooves 8a and 8b are composed of: a wide recessed groove 16 chased (or formed) in the inner surface of each sleeve portion in the longitudinal direction, this recessed groove 16 including the ball rolling surfaces 7a and 7b provided at the up-and-down corners; a ball retaining plate 18 which assumes substantially an L-shape in section and includes a retaining piece 17 which is so protruded as to extend from the ball rolling surfaces 7a and 7b formed at the lower corner of the recessed groove 16, the ball retaining plate 18 being provided on the lower side of the inner surface of each of the sleeve portions 6; and a partition 19, provided between the ball rolling surfaces 7a and 7b, for vertically sectioning the recessed grooves 16. The partition 19 is composed of a partition member assuming a substantially trapezoidal configuration in section which is made separately from the slide board 1, and a part of this partition member is fitted in a dovetail groove 20 formed in the recessed groove 16. In this way, the partition 19 is installed.

In the second embodiment, the relatively large recessed groove 16 is chased in the inner surface of each sleeve portion 6 of the slide board 1, and the ball rolling surfaces 7a and 7b are provided at the up-and-down corners thereof. Therefore, a grind stone for grinding the ball rolling surfaces 7a and 7b can readily be applied. There is an advantage of facilitating the grinding process.

A third embodiment of the rectilinear slide ball bearing will be described with reference to FIGS. 20 through 23. Unlike the first embodiment, the deep grooves which are formed in the inner surface of each sleeve portion 6 of the slide board 1 and constitute the pair of one-sidedly provided up-and-down load ball grooves 8a and 8b are composed of: a ball retaining base 21 which is attached to the under side of the horizontal member 5 within the recession of the slide board 1 and includes retaining pieces 22 provided on both sides thereof; a ball retaining plate 18 which assumes the substantially L-shape in section and includes a retaining piece 17 projecting such as to extend from the ball rolling surfaces 7a and 7b provided at the lower corner of the recessed groove 16, the ball retaining plate 18 being secured to the lower portion of the inner surface of each sleeve portion 6; and a partition 19 provided between a retaining piece 22 of the ball retaining base 21 and the retaining piece 17 of the ball retaining plate 18, the partition 19 being integrally projecting from the inner surface of the sleeve portion 6.

As in the second embodiment, the grind stone for grinding the ball rolling surfaces 7a and 7b can easily be applied in the third embodiment, thereby advantageously facilitating the grinding process. The ball retaining base 21 and the ball retaining plate 18 can readily be attached from the under side of the slide board 1 by, for instance, projection welding or the like. This further facilitates the automation of the bearing assembly.

Figure 24:
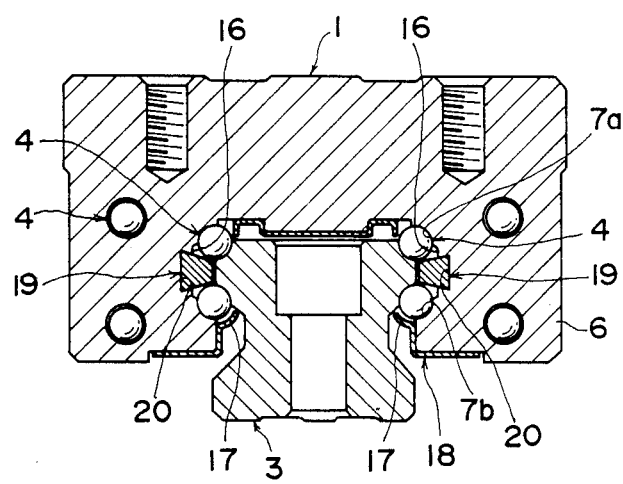
FIG. 24 is a sectional view similar to FIG. 4, showing a variation of the third embodiment.

FIG. 24 shows a variation of the third embodiment. This variation is different from the arrangement shown in FIG. 20. The partition 19, as in the second embodiment, consists of the partition member which takes the substantially trapezoidal shape in section and is formed separately from the slide board 1. A part of the partition member is fitted in the dovetail groove 20 chased in the recessed groove 16, thus securing the partition 19. In this variation, the grinding process of the ball rolling surfaces 7a and 7b is further facilitated.

What is claimed is:

1. A rectilinear slide ball bearing comprising:

a slide board having a substantially gate-like configuration in cross-section and having a horizontal member, sleeve portions extending downwards from both ends of said horizontal member and a recess formed downwards between said sleeve portions, each sleeve portion including a pair of load ball grooves formed on the inner surface thereof and in the longitudinal direction thereof and longitudinal non-load ball passages corresponding to said pair of load ball grooves;

a pair of cover members each fitted to an opposing end surface of said slide board and including ball circulation passages, formed in the inner surface thereof, for providing endless ball tracks by communicating the ends of said load ball grooves with the ends of said non-load ball passages;

a rail-like track mount formed with ball rolling grooves corresponding to said load ball grooves, said track mount having its upper portion fitted in said recess of said slide board, and having a predetermined spacing therebetween; and a plurality of balls rolling between said load ball grooves of said slide board and said ball rolling grooves of said track mount while sustaining a load, wherein said pair of load ball grooves comprises a pair of single-sided up-and-down load ball grooves formed in the inner surface of each sleeve portion of said slide board;

wherein said pair of single-sided up-and-down grooves formed in the inner surface of each sleeve of said slide board in the longitudinal direction are composed of a wide recessed groove in the longitudinal direction said recessed groove including ball rolling surfaces provided at up-and-down corners, a ball retaining plate having a retaining piece which extends from said ball rolling surface provided at the lower corner of said recessed groove, and a partition, provided between said ball rolling surfaces, for vertically sectioning said recessed groove.

2. A rectilinear slide ball bearing comprising:

a slide board having a substantially gate-like configuration in cross-section and having a horizontal member, sleeve portions extending downwards from both ends of said horizontal member and a recess formed downwards between said sleeve portions, each sleeve portion including a pair of load ball grooves formed on the inner surface thereof and in the longitudinal direction thereof and longitudinal non-load ball passages corresponding to said pair of load ball grooves;

a pair of cover members each fitted to an opposing end surface of said slide board and including ball circulation passages, formed in the inner surface thereof, for providing endless ball tracks by communicating the ends of said load ball grooves with the ends of said non-load ball passages;

a rail-like track mount formed with ball rolling grooves corresponding to said load ball grooves, said track mount having its upper portion fitted in said recess of said slide board, and having a predetermined spacing therebetween; and a plurality of balls rolling between said load ball grooves of said slide board and said ball rolling grooves of said track mount while sustaining a load, wherein said pair of load ball grooves comprises a pair of single-sided up-and-down load ball grooves formed in the inner surface of each sleeve portion of said slide board and comprise deep grooves;

wherein said pair of single-sided up-and-down grooves formed in the inner surface of each sleeve portion of said slide board are composed of a ball retaining base attached to the underside of said horizontal member within said recess of said slide board, a ball retaining plate attached to the lower portion of the inner surface of said each sleeve portion, and a partition provided between said ball retaining base and said ball retaining plate.

3. A rectilinear slide ball bearing as set forth in claim 2, wherein said partition is so formed on the inner surface of said each sleeve portion of said slide board in the longitudinal direction as to be integral with said slide board.

4. A rectilinear slide ball bearing as set forth in any one of claims 2 or 3, wherein said partition is constituted by a partition member which has a substantially trapezoidal configuration in section and is formed separatedly from said slide board, and said partition is arranged such that said partition member is fitted in a dovetail groove formed in the inner surface of said each sleeve portion of said slide board in the longitudinal direction.

* * * * *